Sept. 18, 1951

J. C. MUNDAY 2,567,959

FLUIDIZED BED EVAPORATOR AND METHOD

Filed Jan. 28, 1944

John C Munday Inventor
By T. L. Young Attorney

Patented Sept. 18, 1951

2,567,959

UNITED STATES PATENT OFFICE 2,567,959

FLUIDIZED BED EVAPORATOR AND METHOD

John C. Munday, Cranford, N. J., assignor to Standard Oil Development Company, a corporation of Delaware Application January 28, 1944, Serial No. 520,009

4 Claims. (Cl. 159—4)

This invention relates to an improved method for the preparation of dry solids and is especially suited for the evaporation of solutions and the dehydration of solids containing liquids such as water of crystallization.

The technique of evaporation, drying and dehydration of solids is fairly well developed and many solutions and salts can be handled efficiently by the multiple effect evaporators, drum driers, etc., of the known art. However, the known processes have difficulty in handling certain solutions and salts, for example, solutions of calcium and other salts which have a negative solubility gradient with increasing temperature and precipitate out on heat exchange tubes or heating surfaces. Furthermore, difficulties are encountered with those salts which melt in their own water of hydration and salts such as sodium sulfate ($Na_2SO_4.10H_2O$) which first melts in the water of hydration and on partial dehydration to $Na_2SO_4.7H_2O$ becomes less soluble and precipitates out on heating surfaces. The precipitation of these salts on the heating surfaces greatly decreases the heat transfer coefficient.

The present invention provides a method for obtaining dry solids from solutions or from salts containing water of crystallization which overcomes the above disadvantages and in which the temperature is maintained uniform and is subject to very simple and accurate control. Other and further objects of this invention will be apparent from the drawings, the following description and claims.

Figure 1 of the drawing is a diagrammatic illustration in sectional elevation of one embodiment of this invention employing a single shell provided with indirect heat exchange tubes for controlling the temperature.

According to the process of the present invention, the raw material from which the dry solid is to be obtained by dehydration and/or evaporation is mixed with a hot fluidized solid which serves as the heating medium. As a result deposits are formed on the hot fluidized solid rather than on the heating surfaces such as heat exchange tubes and heat transfer is thus maintained at a high rate.

As used throughout this specification and in the appended claims, the terms "fluidized solids" or "fluidized mass of solids" are used to define a dispersion of gas in solids effective in giving the mass fluid characteristics. When fluidized, a mass of solid particles will form a bed having a surface in which individual solid particles have a limited freedom of motion, but are not substantially entrained in the fluidized gas flowing through the bed. The bed has the appearance of a boiling liquid.

The process is applicable to the evaporation of aqueous and non-aqueous solutions, to the drying of slurries, and to the drying of solids such as those containing water of absorption and/or hydration. It is preferred that the solid heat transfer medium have the same composition as the material which is being dehydrated, although if desired other inert solid materials may be used. For example, a solution of calcium nitrate or solid calcium nitrate hydrate is dehydrated by means of hot anhydrous finely divided calcium nitrate. Similarly, $Na_2SO_4.10H_2O$ is dehydrated by means of hot sodium sulfate. It is essential that the amount of hot fluidized solid employed with the material to be dried be sufficient to form a dry, fluidized mixture.

The particle size of the solid heat transfer medium tends to increase as more anhydrous solid is deposited on the particles and in some cases it is necessary to take measures to maintain the desired particle size range as by withdrawing a portion of the powder, grinding and returning fines to the system. In other cases the required particle size range is maintained automatically by attrition or by evaporation of small droplets of a solution by radiation rather than by direct contact with the solid. In any case, it is essential to maintain the heat transfer solid as a finely divided fluidized more or less turbulent mass. In general, good results are obtained by maintaining the solid substantially in the size range between 80 and 400 mesh.

Figures 1, 2:
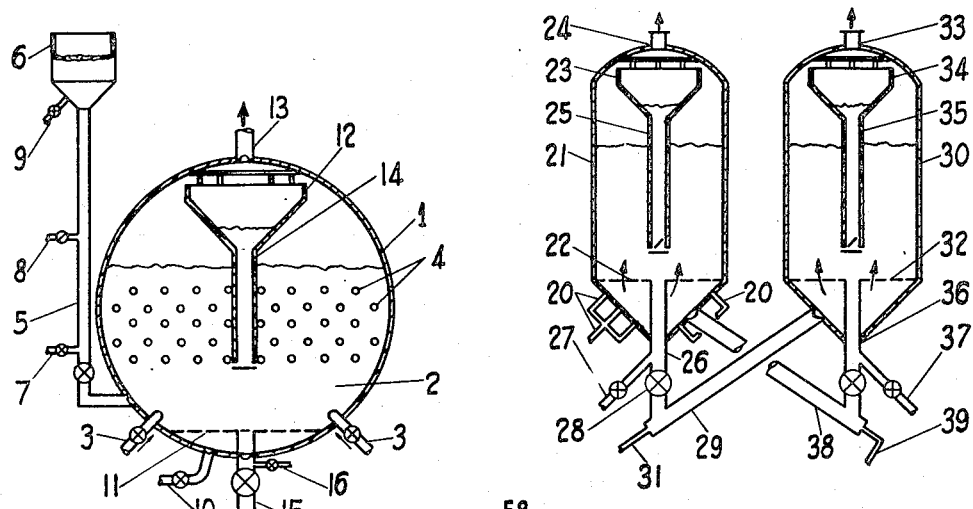
Figure 2 is a diagrammatic illustration of another embodiment of this invention employing two stages for the drying in which heat is supplied by means of a hot gas.

Referring to Figure 1, the solution to be evaporated is injected into a shell 1 containing a mass of finely divided fluidized solid heating medium 2, as for example through nozzles 3. This fluidized solid heating medium is preferably the same as the dry material obtained on evaporating the liquid from the solution to be evaporated. Heat is supplied to the system by means of heat exchange tubes 4. The vapors evolved when the feed material comes into contact with the hot fluidized solid maintains the solid in a highly turbulent state which results in a high heat transfer rate from the heat exchange tubes to the solid and also insures that an excess of hot solid is always present at the point at which the solution is introduced. However, in some cases only a small amount of vapors may be evolved from the material undergoing treatment. In this case, additional agitation is provided by the introduction of a stripping gas into the solid as through line 10 and grid 11. Evolved vapors and stripping gas, if employed, pass upward through the turbulent mass into cyclone separator 12 or other separating device wherein entrained solids are removed and returned to the fluidized mass 2 by means of dip pipe 14. Gases from which solid materials have been removed in separator 12 are withdrawn through line 13 and may be vented to the atmosphere or passed to suitable equipment for the recovery of material or heat. The vapors withdrawn through line 13 may still contain a small amount of fine solid particles which were not separated in separator 12. These fines may be recovered by scrubbing the vapors with water or by partially condensing them and reinjecting the slurry formed by the water scrubbing or the condensation into shell 1 along with the solution to be evaporated through nozzles 3. Dry solid product is withdrawn through line 15 which may be maintained in a fluidized state by gas introduced through line 16.

If, instead of evaporating the solution, it is desired to remove water of hydration from a solid or to remove water from a slurry of a solid in water, such solid or slurry may be introduced into shell 1 through standpipe 5 from hopper 6. This material is preferably finely divided and is kept in a fluidized condition by the injection of small amounts of fluidizing gas into standpipe 5 and hopper 6 through lines 7, 8 and 9.

According to another embodiment of this invention, as illustrated in Fig. 2 the heat supplied to the fluidized solid may be obtained by direct contact with a heating gas. According to this embodiment of the invention, the solution to be evaporated is introduced through one or more lines 20 into a mass of hot fluidized particles in the bottom of shell 21. Evolved vapors containing solid particles in suspension pass upward through grid 22 which distributes the vapors and the solid particles over the cross-sectional area of vessel 21. The solid particles settle out of the vapors above the grid while the vapors and gases pass upwardly through cyclone separator 23 and are withdrawn through line 24. Solid recovered in separator 23 passed downwardly as fluidized particles through pipe 25 and is thereby returned to the evaporation or drying zone. Any fines in the vapors and gases withdrawn through line 24 may be recovered in a manner similar to that described with reference to Fig. 1.

A portion of the solid mass of fluidized particles in vessel 21 is continuously withdrawn through standpipe 26 as a fluidized mass of relatively high density. A sufficient amount of a fluidizing gas is supplied at spaced points along this column, as by line 27, to maintain the solid material in a mobile state. This can be accomplished with a relatively small amount of gas amounting to a total of about 0.5 to 5 cubic feet per 100 pounds of solid particles measured under conditions of highest pressure prevailing at the bottom of column 26. In any case, especially where the solids are transferred at relatively high rates, the amount of gas occluded in the solids leaving the shell 21 may be sufficient to maintain the solids in a fluidized state without adding additional gas to the column 26. When operating in this manner with finely powdered solids, each particle of solid appears to be surrounded by a thin film of gas and the entire mass has the mobility of a freely flowing liquid. Also, the mass follows the hydraulic laws in generating a pressure at any point equal to the product of the average density and the height of the fluidized mass. Fluidized material withdrawn through standpipe 26 is passed through line 29 to a heating zone in shell 30. A heating gas introduced through line 31 carries the fluidized particles through line 29 into the bottom portion of the heating zone. By virtue of the high density of the material at the bottom of the standpipe 26, flow into heating zone 30 is thus made possible simply by providing enough additional gas to maintain a lower density in line 29. Thus the fluidized solid is released at a controlled rate through valve 28 at the bottom of standpipe 26 into a stream of gas to provide a more dilute dispersion of solids in line 29 than in standpipe 26. The fluidized solid and gas pass upwardly from line 29 through distribution grid 32, the fluidized particles settling out of the gas above the grid and the gas being removed overhead through line 33 after passing through separator 34 for the recovery of entrained fines therein. Such recovered fines are returned to the heating and settling zone through dip pipe 35.

Hot fluidized solid particles are withdrawn from shell 30 through standpipe 36 and a portion is withdrawn as a product through line 37. The remainder of the hot fluidized solids is transferred through line 38 to the evaporation and drying zone in shell 21. Flow of the solid particles through line 38 is assisted by the introduction of gas through line 39 in order to reduce the density of the solid materials therein as compared with the density in standpipe 36. Instead of the use of a gas for reducing the density in line 38, the same may be accomplished by the use of wet solid particles from which the water is to be evaporated. If desired, all of the feed can be introduced through line 39 rather than through lines 20.

It will be seen that by withdrawing the product from the heating zone in shell 30 rather than from the evaporation and drying zone in shell 21 the effect of a two-stage drying operation is attained.

Figure 3:
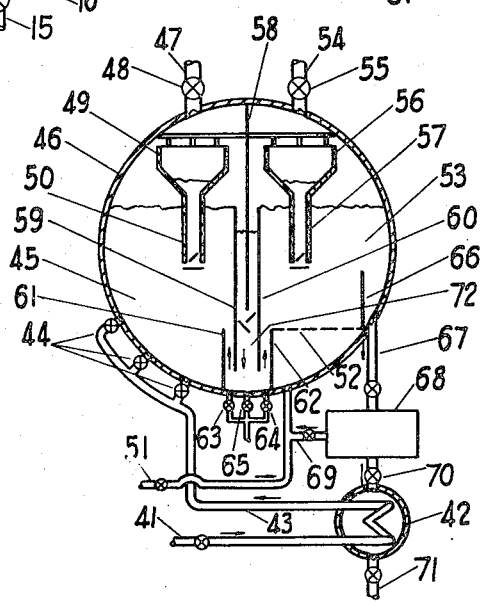
Figure 3 is a diagrammatic illustration of a third embodiment of this invention in which a single shell is employed for the evaporation and drying and wherein a gaseous heating medium is used.

According to a third embodiment of the invention, as illustrated in Fig. 3 a single shell may be used for the evaporation and drying and a gaseous heating medium may be used for supplying sufficient heat to carry out the evaporation and drying. According to this embodiment of the invention, the solution to be evaporated is introduced through line 41 and is preheated by heat exchange with withdrawn product in heat exchanger 42 and is then passed through line 43 and introduced through one or more lines 44 into a mass of hot fluidized particles 45 within shell 46. Vapors formed by evaporation of the liquid in the feed pass upward and are withdrawn through line 47, controlled by valve 48, after passing through solids separator 49, recovered solids being returned through dip pipe 50. Any fines in the vapors withdrawn through line 47 may be recovered in a manner similar to that described in connection with Figs. 1 and 2.

The heating gas is introduced through line 51 and is passed into shell 46 and through distribution grid 52 into a body of fluidized solid particles 53 which is heated by the gas. The gas flows upwardly through solid particles and is withdrawn through line 54, controlled by valve 55, after passing through solids separator 56 from which separated solids are returned to the body of fluidized solid particles 53 by means of dip pipe 57. Fines are removed from the gases withdrawn through line 54 as described above. Baffles 58, 59, 60, 61 and 62 are arranged as shown to separate the shell 46 into an evaporation zone 45 and a heating zone 53. Baffles 59 and 60 are placed vertically in the shell and extend from wall to wall to form a rectangular standpipe 72. Baffle 58 extends vertically from the top of shell 46 downwardly between baffles 59 and 60 in order to isolate the heating gas from the evaporation zone 45. Baffles 61 and 62 extend vertically upward from the bottom of shell 46 on either side of standpipe 72.

In operating the process, fluidized solid particles from the evaporating zone 45 overflow baffle 59 and pass downwardly between baffles 59 and 58. Simultaneously, solid fluidized particles from heating zone 53 overflow baffle 60 and pass downwardly between baffles 60 and 58. The two streams of solid particles become mixed on passing the lower edge of baffle 58. A portion of this mixture passes beneath the lower edge of baffle 59 and rises between baffles 59 and 61 into zone 45, while another portion passes beneath baffle 60 and rises between baffles 60 and 62 into zone 53. It is thus obvious that relatively hot fluidized solid particles are continuously passed to zone 45 for heating the feed introduced through lines 44 and that relatively cool solid particles are continuously passed to zone 53 for reheating by means of the gas introduced through line 51. The solid fluidized particles circulate automatically, being raised in zones 45 and 53 by the vapors and gases respectively and gravitating through the rectangular standpipe 72 by reason of its higher density therein than in the upflow zones 45 and 53. For successful operation, the gas pressure above the powder in the two zones 45 and 53 should be approximately equal, or at least not sufficiently different to break the powder seal between the zones in the upper portion of standpipe 72 on either side of baffle 58. The rate of flow of the solid fluidized particles can be controlled by varying the density of the solid particles in standpipe 72, and in the upflow passages defined by baffles 61 and 69, and 60 and 62. For example, the rate can be increased by introducing gas through lines 63 and 64 into solid particles passing upward to zones 45 and 53 between baffles 59 and 61 and baffles 60 and 62, respectively. Similarly, the rate can be decreased by introducing gas into the standpipes between baffles 59 and 60, for example through line 65.

Dry solid fluidized particles may be withdrawn as desired product from zone 53 from behind baffle 66 by means of line 67. If there is a tendency for the particle size to grow larger in the system due to deposition of dry solid salts thereon, the solid particles may be passed to any suitable means 68 for classifying or grinding as desired and then returned to the system through lines 69 and 51. Coarser materials may be passed from classifying or grinding equipment 68 through line 70 to heat exchanger 42 to heat the incoming feed material in line 41 and finally withdrawn through line 71.

The composition of the heating gas used in the modifications illustrated in Figures 2 and 3 depends upon the material which is being evaporated or dehydrated. In some cases, for example in the dehydration of $Na_2SO_4.10H_2O$, hot flue gas is suitable. In other cases, as in the drying of calcium chloride, flue gas containing carbon dioxide would be unsuitable and inert gas must be employed. The temperature of the gas must also be considered since in the drying of heat-sensitive materials the temperature of the heating gas must not be too high. In the case of materials which are extremely heat sensitive, evaporation may be conducted under vacuum and/or with a large amount of stripping gas, and the temperature may be far below the boiling point of water or other solvent at atmospheric pressure. When drying materials which are relatively insensitive to heat, the temperature may be several hundred degrees centigrade or higher.

In the above paragraphs it has been suggested that the hot fluidized solid used as heat transfer medium be the same as the solid from which liquid is sought to be removed. However, it is within the scope of this invention to use any other inert finely divided solid as desired. If a different solid is used than that from which the liquid is to be removed, it may be necessary to recover any deposited solid from the inert solid. This may be accomplished by dissolving the deposited solid in a small amount of any suitable solvent to get a concentrated solution. For example, dilute sugar solutions may be evaporated in the presence of hot fluidized inert solid particles such as sand. Sand containing deposited sugar would then be treated with small amounts of water to produce a concentrated sugar syrup.

From the above description it is clear that a novel and economical method has been described for obtaining dry salts or other compounds from their combinations with liquids, which overcomes disadvantages of methods known in the prior art. A particular advantage, in addition to those outlined above, is that the temperature of the heating medium can be maintained higher than in the usual drying systems. This results from the fact that the finely divided fluidized solid particles are maintained as a continuously churning highly turbulent mass so that temperature differences are almost instantly neutralized, and although a portion of the solid particles may be heated to the high temperature it remains at this high temperature for such a short period of time before it is cooled by contact with other cooler particles that no harm results.

The nature and objects of this invention having been thus set forth and specific descriptions of the same given, what is claimed as new and useful and desired to be secured by Letters Patent is:

1. Apparatus for contacting fluidized solid particles with fluids and gases, comprising a shell, means for introducing solid particles into said shell, means for separating said shell into two zones, means for fluidizing solid particles in each zone, means for introducing a fluid into one of said zones, means for introducing a gas into the other of said zones, a vertical standpipe in said shell between said zones, means for passing fluidized solids from each of said zones into said standpipe, means for mixing said fluidized solids passed into said standpipe and means for returning a portion of said mixed fluidized particles into each of said zones.

2. Apparatus for contacting fluidized solid particles with fluids and gases comprising a shell, means for introducing solid particles into said shell, means for vertically separating said shell into two zones communicating with each other at the bottom, means for fluidizing solid particles in each zone, means for introducing a fluid into one of said zones, means for introducing a gas into the other of said zones, means for withdrawing fluidized particles from each of two said zones, means for mixing said particles withdrawn from said zones, means for passing a portion of said mixed fluidized particles into each of said zones, and means for withdrawing gases from the top of said shell.

3. Apparatus for contacting fluidized solid particles with fluids comprising a shell, baffles spaced from the top and bottom of said shell to form a standpipe in said shell, a baffle extending from the top of said shell toward the bottom thereof into said standpipe so as to separate said shell into two zones, a baffle extending upwardly from the bottom of said shell on each side of said standpipe to provide communications from said standpipe to each of said zones, means for introducing fluid into each zone, and means for withdrawing gases from the top of each of said zones.

4. Process for contacting fluidized solid particles with gases and with combinations of solids and liquids, comprising maintaining in each of two zones a bed of fluidized solid particles, introducing a solid-liquid combination substantially at the bottom of the first zone, withdrawing vapors from the said zone, introducing a gas substantially at the bottom of the second zone, withdrawing gas and residual liquid vapor from said second zone, withdrawing fluidized solid particles from each of the said zones and mixing said withdrawn particles, returning a portion of said mixed particles to each of said zones, maintaining in each zone a temperature and ratio of fluidized particles to incoming material sufficiently high to form a dry fluidized mixture, and withdrawing a stream of dry fluidized particles from the second zone.

JOHN C. MUNDAY.

REFERENCES CITED

The following references are of record in the file of this patent:

UNITED STATES PATENTS

| Number | Name | Date |
|---|---|---|
| 1,661,203 | Toniolo | Mar. 6, 1928 |
| 1,886,580 | Pierce | Nov. 8, 1932 |
| 1,983,943 | Odell | Dec. 11, 1934 |
| 2,118,078 | Flugel | May 28, 1938 |
| 2,358,039 | Thomas et al. | Sept. 12, 1944 |
| 2,378,342 | Voorhees et al. | June 13, 1945 |
| 2,413,271 | Warrick | Dec. 24, 1946 |